(12) United States Patent
Kazmi et al.

(10) Patent No.: US 9,838,193 B2
(45) Date of Patent: Dec. 5, 2017

(54) CHANNEL STATE INFORMATION FEEDBACK FOR FULL DUPLEX CELLULAR COMMUNICATIONS

(71) Applicant: Telefonaktiebolaget L M Ericsson (publ), Stockholm (SE)

(72) Inventors: Muhammad Kazmi, Bromma (SE); Gabor Fodor, Hässelby (SE); Dennis Hui, Sunnyvale, CA (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 126 days.

(21) Appl. No.: 14/829,073

(22) Filed: Aug. 18, 2015

(65) Prior Publication Data

US 2017/0054544 A1   Feb. 23, 2017

(51) Int. Cl.
| | |
|---|---|
| *H04L 12/26* | (2006.01) |
| *H04L 5/14* | (2006.01) |
| *H04L 5/00* | (2006.01) |
| *H04W 72/08* | (2009.01) |
| *H04B 17/309* | (2015.01) |
| *H04W 24/08* | (2009.01) |
| *H04W 24/10* | (2009.01) |
| *H04B 17/24* | (2015.01) |

(52) U.S. Cl.
CPC .............. *H04L 5/14* (2013.01); *H04B 17/309* (2015.01); *H04L 5/0044* (2013.01); *H04W 24/08* (2013.01); *H04W 24/10* (2013.01); *H04W 72/082* (2013.01); *H04B 17/24* (2015.01)

(58) Field of Classification Search
None
See application file for complete search history.

(56) References Cited

U.S. PATENT DOCUMENTS

| | | | |
|---|---|---|---|
| 2005/0243748 A1 | 11/2005 | Bosch et al. | |
| 2009/0213765 A1* | 8/2009 | Rinne | H04B 1/44 370/278 |
| 2011/0222445 A1* | 9/2011 | Alanara | H04W 36/06 370/281 |

(Continued)

FOREIGN PATENT DOCUMENTS

| | | |
|---|---|---|
| CN | 103974433 A | 8/2014 |
| GB | 2499259 A | 8/2013 |

(Continued)

*Primary Examiner* — Otis L Thompson, Jr.
(74) *Attorney, Agent, or Firm* — Coats & Bennett, PLLC

(57) ABSTRACT

A method is performed at a user device, UE (12), for supporting a transmission mode configuration with respect to a communication channel between the UE (12) and an network node (14) of a radio network. The method comprises determining an impact of self-interference at a receiver of the UE (12) due to an uplink transmission to the network node (14) in case of full duplex communication, generating a channel state information comprising an information of said impact of self-interference, and transmitting the channel state information to the network node (14) to support said node in taking a decision between half duplex and full duplex communication configuration for the communication channel. A corresponding method is performed at a network node (14). Embodiments herein further include a UE (12), a network node (14) and computer programs thereto.

17 Claims, 6 Drawing Sheets

(56) References Cited

U.S. PATENT DOCUMENTS

| | | |
|---|---|---|
| 2011/0292843 A1* | 12/2011 | Gan .................. H04B 7/15557 370/277 |
| 2012/0201173 A1 | 8/2012 | Jain et al. |
| 2012/0250526 A1* | 10/2012 | Zhao .................... H04B 7/2606 370/243 |
| 2013/0223394 A1 | 8/2013 | Nishio et al. |
| 2014/0169234 A1 | 6/2014 | Zhu et al. |
| 2014/0328228 A1* | 11/2014 | Park .................... H04B 7/2615 370/280 |
| 2015/0318878 A1* | 11/2015 | Damodaran ............. H04B 7/04 375/296 |
| 2016/0218853 A1* | 7/2016 | Takeda ................ H04W 72/048 |
| 2016/0242072 A1* | 8/2016 | Hsu ....................... H04W 28/06 |
| 2016/0337107 A1* | 11/2016 | Tabet ......................... H04L 5/14 |
| 2017/0041124 A1* | 2/2017 | Khandani ............. H04L 5/1423 |

FOREIGN PATENT DOCUMENTS

| | | |
|---|---|---|
| WO | 2013012913 A1 | 1/2013 |
| WO | 2015096027 A1 | 7/2015 |

* cited by examiner

CHANNEL STATE INFORMATION FEEDBACK FOR FULL DUPLEX CELLULAR COMMUNICATIONS

TECHNICAL FIELD

The present invention generally relates to resource or transmission scheduling performed by a radio access network, based on channel state information feedback from a UE, and more specifically relates to efficiently scheduling full duplex or half duplex transmission modes.

BACKGROUND

In a typical cellular system, also referred to as a wireless communications network, wireless terminals, also known as mobile stations or user equipments communicate via a Radio Access Network, RAN, to one or more core networks. The radio access network may comprise access points, AP, or base stations, BS that communicate with the user equipments by means of radio signals and provide access to the core network.

The Third Generation Partnership Project, 3GPP, has established a plurality of generations of mobile communication standards. The Universal Mobile Telecommunications System, UMTS, is a third generation mobile communication system, which evolved from the Global System for Mobile Communications, GSM, to provide mobile communication services based on Wideband Code Division Multiple Access, WCDMA, access technology. Long-Term Evolution, LTE, often being referred to as fourth generation, has been specified to increase the capacity and speed using a different radio interface together with core network improvements. The standard is specified in several releases starting with Release 8 document series, and comprising enhancements described in further releases.

In cellular communication systems, downlink, DL, pilots or reference signals (RS) of predefined and known characteristics are regularly transmitted by the infrastructure access points or base stations of the radio access network to the user equipments. The reference signals are used (e.g. measured) by both idle and active user equipments, e.g. for the purpose of mobility measurements, cell association, as reference for channel state information, CSI, estimation and data demodulation, or supporting channel state dependent scheduling algorithms (the exact usage may be system dependent). CSI refers to known channel properties of a communication link.

In the following, the current technique will be described for the example of LTE. According to LTE specifications, some of the reference signals are called cell specific reference signals, CRS, that have a predefined pattern covering the entire frequency band, and are transmitted four times per millisecond (assuming two antenna ports).

According to 3GPP Technical Specification 36.213, current version 12.5.0, in the following being referred to as TS 36.213, the UE shall perform a periodic and/or an aperiodic reporting of channel state indicators. This information may be used by the radio access network for scheduling decisions (e.g. comprising a selection of a modulation and coding scheme, MCS, to be used by the UE for transmitting a certain transport block, and a resource block, RB, allocation to the UE) to ensure an efficient usage of radio resources.

The CSI feedback transmitted by the UE in the uplink can be regarded as an implicit indication of the data rate which can be supported by the wireless channel, taking into account the prevailing or predicted Signal to Interference plus Noise Ratio, SINR, level and characteristics of the UE receiver.

According to 3GPP TS 36.213, section 7.2, the CSI to be reported by the UE comprises a so-called Channel Quality Indicator, CQI, and may comprise further indicators such as a so-called Pre-coding Matrix Indicator, PMI, and a so-called Rank Indicator, RI.

According to TS 36.213, section 7.2.3, the UE shall report to the radio terminating node of radio access network, the highest wideband CQI value within a range of suitable CQI values matching to an instantaneous radio condition experienced by the UE, given the receiver capabilities of the UE, resulting into a block error rate, BLER, equal or below 10%. The BLER therein represents a ratio of a number of erroneous data blocks and a corresponding total number of received data blocks. As currently defined in above-cited TS 36.213, there are 16 CQI values from 0 to 15 each associated to a certain efficiency, wherein the code rate and hence the efficiently increases with the value.

For certain transmission modes, the precoding matrix indicator, PMI, received from the UE may be used for channel dependent codebook based precoding.

For spatial multiplexing, the UE determines a RI corresponding to the number of useful transmission layers.

The appropriate access point or base station, also being referred to as eNodeB or eNB in the context of LTE, selects different CSI or CQI feedback modes that trade off improved downlink modulation and coding scheme (MCS) selection against the uplink overhead that CQI feedback implies. According to the preceding discussion, the CQI feedback is derived from the downlink reference signals, based on the UE measurements that allow the UE to estimate the highest MCS (rate) that the UE expects to be able to decode with some predefined bit error rate or block error rate, BLER, target. For example, a UE with advanced receiver capabilities and interference cancellation capabilities may report a higher MCS value than a UE with a low complexity receiver structure under similar interference and expected SINR conditions. RI and PMI feedback from the UE may be used by the eNB to select an appropriate rank and pre-coding for Multiple Input Multiple Output, MIMO, operations of the UE.

Other cellular and wireless technologies (e.g. wideband code division multiple access (WCDMA), high speed packet access, WiMax) typically provide some (similar) type of pilot or reference signals (for example in the form of pilot channels as in WCDMA) to support mobility measurements, channel state dependent algorithms or demodulation of control and data information.

Classical wireless systems are designed on the premise of half-duplex (HD) communication that does not allow a simultaneous transmission and reception of radio signals on the same frequency channel. Examples on HD transmission and reception schemes include half duplex frequency division duplexing (HD FDD) and time division duplexing (TDD) that enable separating the transmitted and received signals at a radio transceiver either in frequency or in time or in both. Full duplex frequency division duplexing (FD FDD) enables simultaneous transmission and reception of radio signals but the transmission and reception of radio signals take place on different carrier frequencies.

In contrast, full-duplex (FD) communication enables simultaneous transmission and reception of radio signals on the same carrier frequency.

FD communication systems face the problem of self-interference, SI, in a way that the received signal from peer transmitter is disturbed by the signal sent by the own transmitter. The caused SI thus depends on the own transmit power; in case that the device is a UE, the SI is a function of the UL transmit power.

Recently efforts have taken to overcome the basic assumption that full duplex communication may not be practically viable due to the large SI caused by a radio transmitter at the radio receiver. Thereto, full-duplex capable devices may be equipped with analog cancellation circuitry operating at radio frequency and/or with digital cancellation circuitry operating at baseband frequency. However, the remaining SI after cancellation may still be significant especially in situations wherein the transmit power is rather high compared to the receive power at the device.

SUMMARY

It is an object of the present invention to improve an efficiency of a communication with a wireless communication device connected to a radio communications network. More specifically, it is an object to increase the data rate to schedule a full duplex communication based on channel state conditions.

According to embodiments, an information indicative of a channel condition associated to a full duplex communication between the wireless communication device or UE, and a network node of the communications network, e.g. an access node or an eNB serving the device is determined, e.g. by predicting, estimating, measuring or performing a combination of predicting, estimation and/or measuring of corresponding channel condition associated to a communication channel between the UE and the network node.

This information of the channel condition associated to a full duplex communication, in the following also being referred to as full duplex channel state information or CSI-FD, is provided to the network to support or enable the network in taking a decision about a transmission mode for the UE, e.g. whether to configure the UE to using full duplex, FD, transmission mode or half duplex, HD, transmission mode.

In an embodiment, the CSI-FD is generated to be indicative of an estimated, predicted and/or calculated impact of self-interference, SI, at the receiver of the UE due to the UL transmission of the UE. This generation may be performed by the UE or by the network or in cooperation between both the UE and the network. The information may further take into account FD related capabilities of the UE (e.g. a SI suppression capability of the UE e.g. taking into account analog cancellation and/or digital cancellation capabilities).

In an embodiment, the UE determines the impact of SI and generates a report comprising the CSI-FD. The UE may send the CSI-FD as part of an enhanced CSI report e.g. as being enhanced over a CSI report defined in afore-mentioned 3GPP TS 36.213 to the network. In an embodiment, the CSI-FD further comprises information indicative of a HD and/or FD communication configuration, and/or of HD and/or FD capabilities for the communication channel.

In an embodiment, the network compares an achievable overall bit rate associated each to using HD and FD transmission modes taking into account the CSI-FD. The network may thus determine an appropriate duplexing communication scheme (HD, FD) to allow for an optimum throughput and/or an optimum use of resources.

In an embodiment, the network configures the UE for one of a HD transmission mode and a FD transmission mode. When being configured in FD transmission mode, the UE may be prepared to be scheduled for HD operation, while it may still be scheduled to transmit and receive signals using HD transmission mode.

In an embodiment, the network uses the information to decide whether to schedule the UE in FD communication mode or in HD communication mode over a certain number of following time resources. A time resource can be a symbol, time slot, subframe, transmission time interval (TTI), scheduling duration, interleaving time etc.

In an embodiment, the network decides about the communication mode of operation based on one or a plurality of received CSI-FD reports, e.g. by aggregating a certain number of consecutive CSI-FD values.

According to embodiments, the CSI-FD comprises information about a DL Signal-to-SI Ratio, SSIR. The SSIR may be determined based on measurements and/or estimations of the UE. The SSIR may be part of the CSI-FD report sent by the UE. Alternatively, the UE sends measurement/estimations as part of the CSI-report, so that the network may determine the SSIR based on the CSI-FD report.

Beyond enabling the network to take a proper decision between HD or FD transmission mode configuration, the SSIR information may support the network to configure DL MCS, and/or the UL transmit power of the UE (e.g. to maximize the overall spectral efficiency).

According to embodiments, the SSIR is determined based on estimates or measurements of the SINR associated to FD communication and the SINR associated to HD communication at a certain UL transmit power, e.g. at maximum UL transmit power.

In an embodiment, an extended CSI report may be generated by the UE comprises the following indicators:
CQI-HD providing information about (or specifying a range of) DL SINR assuming no self-interference in the assigned DL resources; and
CQI-FD providing information about (or specifying a range of) DL SINR assuming a (maximum) UL transmit power causing self-interference in the assigned DL resources.

The SSIR at maximum UL transmit power and respective Signal-to-Interference-plus-Noise Ratios, SINR, for FD and HD may satisfy the following equation:

$$\frac{1}{SINR_{FD}} = \frac{1}{SINR_{HD}} + \frac{1}{SSIR}$$

wherein $SINR_{FD}$ is an estimate and/or a measurement of the SINR for FD, and $SINR_{HD}$ is an estimate and/or a measurement of the SINR for HD.

In an embodiment, the SSIR value is determined based on a $SINR_{FD}$ value and $SINR_{HD}$ value, e.g. by calculating or estimating the following equation:

$$SSIR = \left(\frac{1}{SINR_{FD}} - \frac{1}{SINR_{HD}}\right)^{-1}$$

The SINR values can be determined as fast as very time resource e.g. time slot, subframe, scheduling time interval. The SINR values may be typically measured on reference signals (RS) such as common or dedicated reference signals. Examples of common RS are cell specific RS (CRS), discovery RS (DRS), channel state indicator RS (CSI-RS).

An example of a dedicated reference signal, also being referred to as UE specific RS, is the so-called demodulation RS (DMRS).

In an embodiment, a user equipment UE is concerned for performing a certain transmission mode with respect to a communication channel between the UE and a network node of a radio network, comprising the following modules:
a capability evaluation module adapted to determining an impact of self-interference at a receiver of the UE due to an uplink transmission to the network node in case of full duplex communication,
a scheduling reception module adapted to receive a scheduling decision indicative of whether the UE shall perform half duplex or full duplex communication, and
a channel state processing and reporting module adapted to reporting channel state information comprising an information about the impact of self-interference.

In an embodiment, a network node of a radio network communicating with a UE over a communication channel is concerned, comprising the following modules:
a channel state information evaluation module adapted for receiving channel state information from the UE and determining from the channel state information an impact of self-interference at a receiver of the UE due to an uplink transmission to the network node,
a scheduling module adapted for performing a scheduling decision amongst half duplex and full duplex communication for the communication channel, based on an amount of impact of the self-interference.

Further embodiments concern computer programs comprising portions of software codes in order to implement the method as described above when operated by a respective processing unit of the UE or wireless device, or the network node or base station. The computer programs can be stored on a computer readable medium. The computer-readable medium can be a permanent or rewritable memory within the wireless or network node, or located externally. The respective computer program can be also transferred to the respective wireless device or network node for example via a cable or a wireless link as a sequence of signals.

In the following, detailed embodiments of the present invention shall be described in order to give the skilled person a full and complete understanding. However, these embodiments are illustrative and not intended to be limiting.

BRIEF DESCRIPTION OF THE DRAWINGS

The accompanying drawings illustrate several aspects of the disclosure, and together with the description serve to explain the principles of the disclosure.

DETAILED DESCRIPTION

Figure 1:
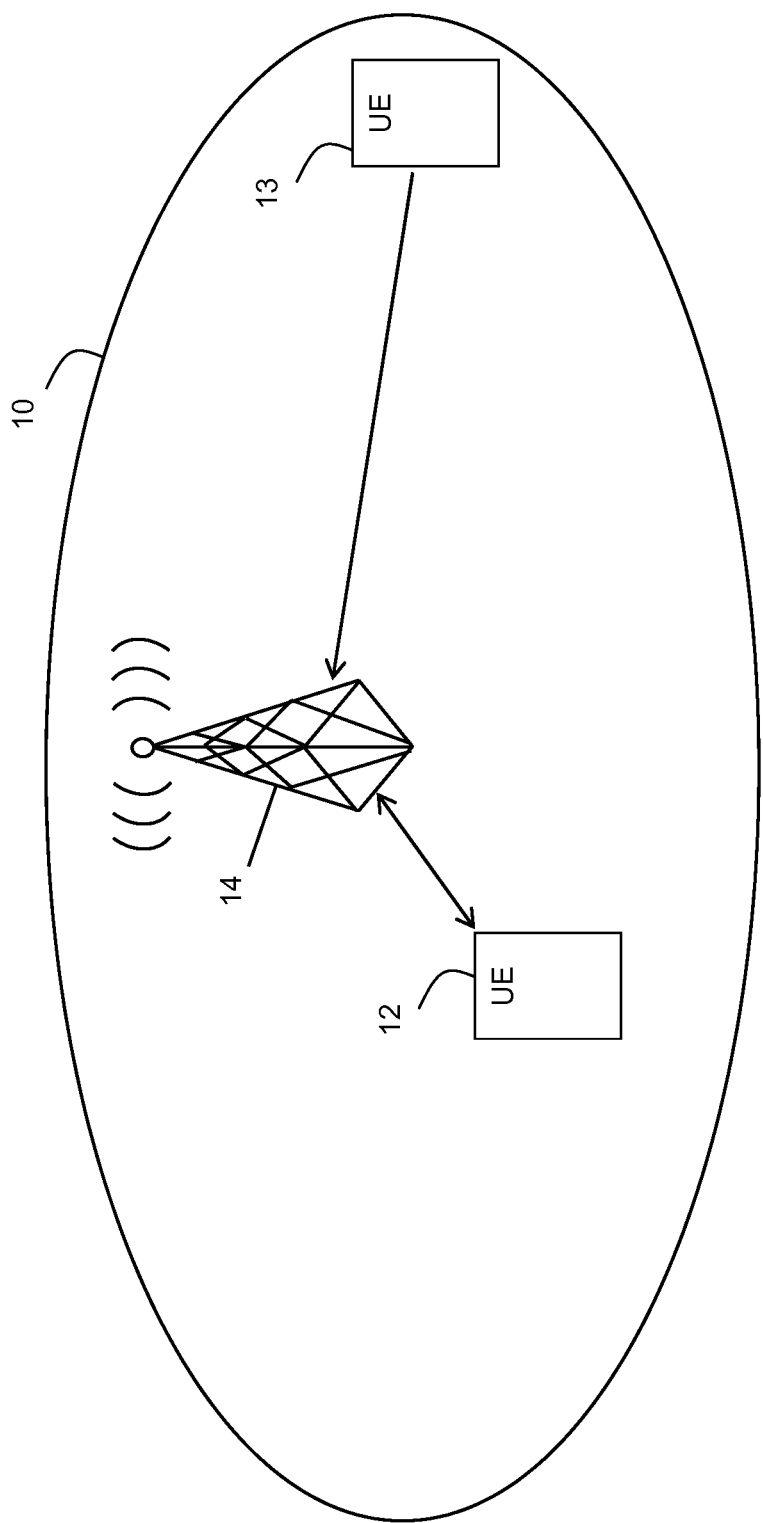
FIG. 1 illustrates an example of a cellular communications network implementing a transmission mode configuration with respect to wireless devices communicating with the network according some embodiments of the present disclosure.

As shown in FIG. 1 the example network 10 may include one or more instances of wireless communication devices 12 and 13 (e.g. conventional user equipments (UE), or machine type communication (MTC) or machine-to-machine (M2M) equipments) and one or more radio access nodes. In the following example, the wireless communication devices 12 and 13 are being referred to as UEs and the radio access node 14 will be referred to as eNodeB or base station, BS 14.

Base station 14 is capable of communicating with UE 12 and UE 13 along with any additional elements suitable to support communication between wireless communication devices or between a wireless communication device and another communication device (such as a landline telephone). Although the illustrated UEs 12 and 13 may represent communication devices that include any suitable combination of hardware and/or software, these devices may, in particular embodiments, represent devices such as the example wireless communication device illustrated in greater detail by FIG. 5 and FIG. 6. Similarly, although the illustrated base station 14 may represent a network node that include any suitable combination of hardware and/or software, this node may, in particular embodiments, represent a device such as the example base station illustrated in greater detail by FIG. 7 and FIG. 8.

For simplicity and ease of discussion, the wireless communication network 10 comprises one radio access node being depicted as base station 14 and two wireless devices depicted as first and second UE 12 and 13 respectively. It should be understood that the cellular communications network 10 may include any number of radio access nodes serving any number of wireless communication devices. The base station 14 is connected to a core network (not shown).

In embodiments, the UE 12 and UE 13 determine each an impact of self-interference at its receiver due to an uplink transmission towards the base station 14. Each UE generates information indicative of said impact of self-interference, and transmits the information to the base station 14. The base station uses this information to decide for a communication configuration for the respective UE. Bay way of example, the first UE 12 is being configured to full duplex communication (symbolized by a double arrow) and the second UE 12 is being configured to half duplex communication (symbolized as single arrow).

In the following, exemplary embodiments will be described with respect to the (first) UE 12. In an embodiment, the channel state information is indicative of an impact of self-interference, SI, due to the UL transmission of the UE 12. This information may be obtained by the UE 12 or by the network 10 (e.g. by the base station 14) or in cooperation between both the UE and the network. The information may further take into account FD related capabilities (e.g. a SI suppression capability) of the UE 12.

When configured in FD mode, the UE 12 may be always prepared to be scheduled using HD operation, while when configured in FD mode of operation, the UE may still be scheduled to transmit and receive signals using HD operation.

In an embodiment, the information is obtained by estimating, predicting and/or a calculating the impact of the SI at the UE 12. The UE may generate corresponding channel state information related to Full Duplex communication, also being referred to as CSI-FD in the following.

In an embodiment, the network uses the information to decide whether to schedule the UE 12 in FD communication mode or in HD communication mode over a certain number of following time resources. A time resource can be a symbol, time slot, subframe, transmission time interval (TTI), scheduling duration, interleaving time etc.

According to embodiments, the CSI-FD is indicative of the DL Signal-to-SI ratio, SSIR. The SSIR may be determined by the UE or by the network based on measurements or estimates performed by the UE 12. Beyond enabling the network node to take a proper decision between HD or FD transmission mode configuration, the SSIR information may support the network node to configure DL MCS, and/or the UL transmit power (to maximize the overall spectral efficiency).

Figure 2:
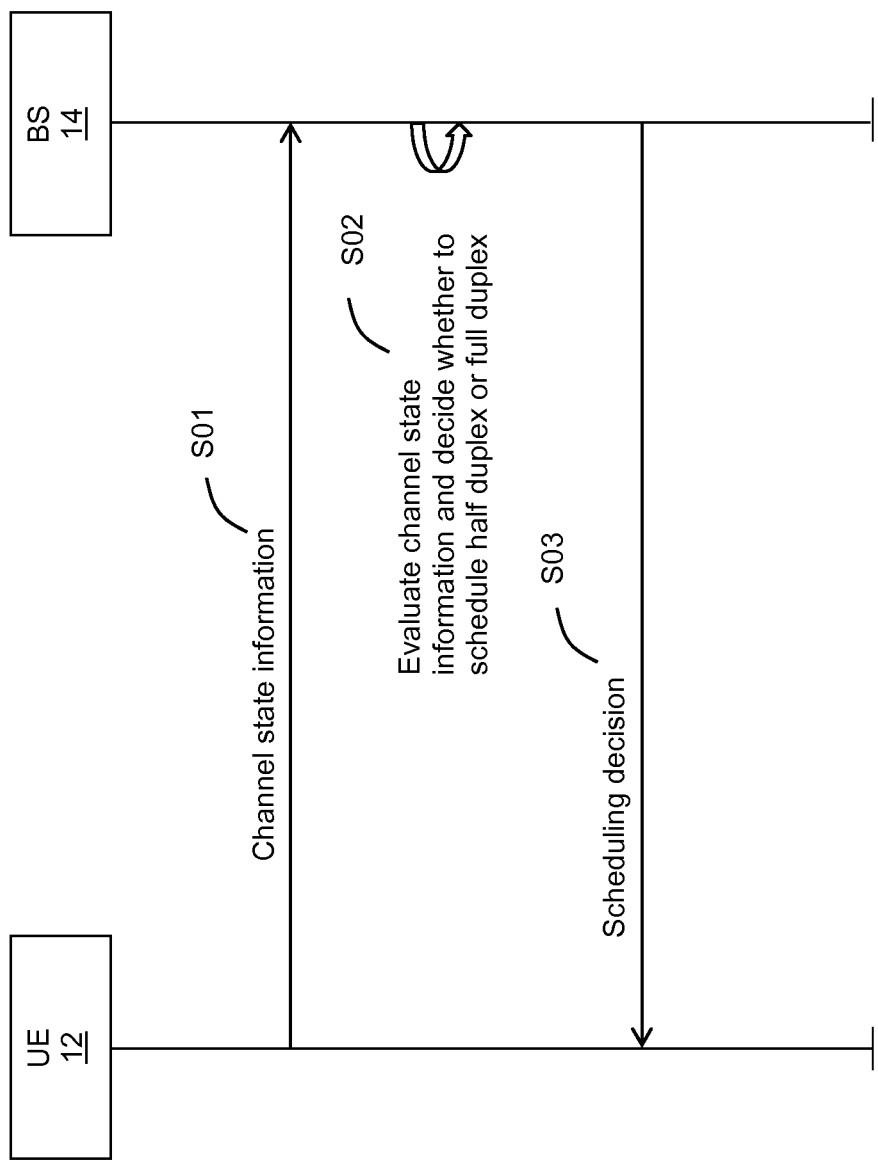
FIG. 2 illustrates a sequence of messages and steps performed by a wireless device and a base station for channel state information reporting according to some embodiments of the present disclosure.

FIG. 2 illustrates a principle method for a scheduling decision at the base station 14 with exemplary sequence of messages and steps performed by the UE 12 and a base station 14.

In a first step (of this method) S01 the UE 12 sends channel state information related to full duplex communication, CSI-FD, to the base station 14. This message is indicative of an impact of self-interference, SI, due to an UL transmission of the UE 12.

In a second step S02, the base station 14 evaluates the channel state information to decide whether to schedule the UE 12 for half duplex or for full duplex communication.

In a third step S03, the base station 14 sends a corresponding scheduling decision back to the UE 12.

The CSI-FD may be sent as part of an enhanced or modified CSI report compared to the CSI report as defined in afore-mentioned 3GPP TS 36.213. An enhanced CSI report may further comprise CSI related to HD, in the following also being referred to as CSI-HD, according to 3GPP TS 36.213.

Figure 3:
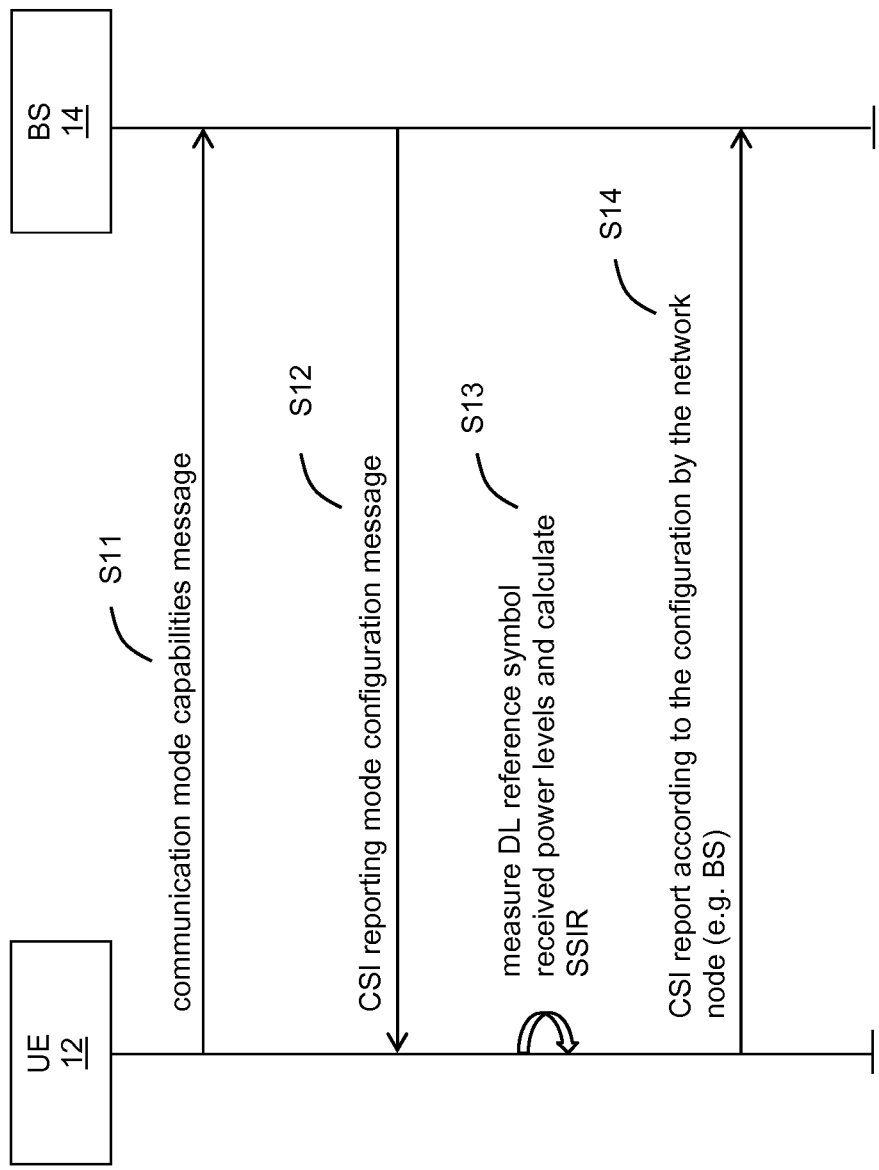
FIG. 3 illustrates a sequence of messages and steps performed by a wireless device and a base station for a channel state information configuration according to some embodiments of the present disclosure.

Before starting the CSI reporting operations, the base station 14 may configure the CSI reporting with respect to the UE 12. FIG. 3 thereto illustrates a method with exemplary sequence of messages and steps performed by the UE 12 and a base station 14.

In a first step (of this method) S11 the UE 12 sends a (transmission) mode capability message to the base station 14. This message is indicative of whether the UE is capable of FD communication or not. The message may be further indicative of a SI suppression capability at the UE.

In a second step S12, the base station 14, sends a CSI configuration message to the UE 12. This message may indicate whether the UE shall transmit a report indicative of one of: CSI-FD, E-CSI-FD, and both CSI-FD and E-CSI-FD.

The CSI configuration message may further specify CSI-FD contents (e.g. a format and/or kinds of information to be reported with respect to FD).

The CSI configuration message may further specify additional information related to the CSI reporting. Examples of additional information are whether the CSI report is periodic, aperiodic, and in case of periodic CSI reporting, a periodicity for such reporting, as being explained in more detail later-on.

In a third step S13, the UE 12 determines the SSIR e.g. based on estimates or measurements of the SINR for FD, $SINR_{FD}$, and the SINR for HD, $SINR_{HD}$, at a defined UL transmit power, e.g. at maximum UL transmit power.

The SSIR at maximum UL transmit power and respective SINR for FD and HD may satisfy the following equation:

$$\frac{1}{SINR_{FD}} = \frac{1}{SINR_{HD}} + \frac{1}{SSIR}$$

The SSIR can thus be determined by the UE 12 as a function of $SINR_{FD}$ and $SINR_{HD}$, e.g. by solving the following equation:

$$SSIR = \left(\frac{1}{SINR_{FD}} - \frac{1}{SINR_{HD}}\right)^{-1}$$

The SINR values may be estimated as fast as very time resource e.g. time slot, subframe, or scheduling time interval. The SINR values may be measured on reference signals (RS) such as common or dedicated reference signals. Examples of common RS are cell specific RS (CRS), discovery RS (DRS), channel state indicator RS (CSI-RS). An example of a dedicated reference signal, also being referred to as UE specific RS, is the so-called demodulation RS (DMRS).

In a fourth step S14, the UE 12 sends a CSI report indicative of the SSIR in accordance with the received CSI configuration message back to the base station 14; that step may be similar to step S01 of FIG. 2.

The base station may take the scheduling decision based on a plurality of received CSI reports, e.g. by aggregating a certain number of CQI values of consecutive reports.

Alternatively, the CSI report may be indicative of the $SINR_{FD}$ and $SINR_{HD}$, so that the network may determine the SSIR based on the CSI report.

The determined SSIR value may tend to grow large when the impact of SI is small in terms of the caused SINR difference between the estimated or measured SINR value between FD and HD operation modes. Thus, alternatively to the SSIR determination explained above, given the ranges of SINR for FD and HD indicated by CQI-FD and CQI-HD, respectively, the range of SSIR may be derived as:

$$\left(\frac{1}{SINR_{FD,min}} - \frac{1}{SINR_{HD,max}}\right)^{-1} \leq SSIR \leq \left(\frac{1}{SINR_{FD,max}} - \frac{1}{SINR_{HD,min}}\right)^{-1}$$

wherein:
$SINR_{FD,min}$ is the lower limit of the range of SINR values indicated by CQI-FD,
$SINR_{FD,max}$ is the corresponding upper limit indicated by CQI-FD,
$SINR_{HD,min}$ is the lower limit of the range of SINR values indicated by CQI-HD, and
$SINR_{HD,max}$ is the corresponding upper limit indicated by CQI-HD.

As an example the difference $\Delta X = (SINR_{FD,max} - SINR_{FD,min})$ is 2 dB, while the value of $SINR_{FD,min}$ may be of a range from −10 dB to 30 dB. As a similar example, the difference $\Delta Y=(SINR_{HD,max}-SINR_{HD,min})$ is 2 dB, while the value of $SINR_{HD,min}$ may be of a range from −10 dB to 30 dB.

CQI_HD and CQI_FD may be represented by an index to a table wherein each entry of the table represents a range of SINR values (e.g. an interval [SINR_min, SINR_max]). For example, the UE 12 may measure the SINR from the received signal and check which entry of the table the estimated SINR falls into. Then the UE may report the index of this entry to the network. Upon the receipt of this index, the network checks the table and finds out SINR_min and SINR_max values.

In an embodiment, the midpoint SSIR_mid of the above interval is used as an estimate of SSIR:

$$SSIR\_mid = \frac{1}{2}\left(\frac{1}{SINR_{FD,min}}-\frac{1}{SINR_{HD,max}}\right)^{-1} + \frac{1}{2}\left(\frac{1}{SINR_{FD,max}}-\frac{1}{SINR_{HD,min}}\right)^{-1}$$

Thus, the determination of the SSIR information may be based on (predetermined) SINR limit values $SINR_{FD,min}$, $SINR_{FD,max}$, $SINR_{HD,min}$ and $SINR_{HD,max}$.

The SSIR may depend upon the extent to which the UE can mitigate the self-interference (SI). As a result, the SSIR may be in a range between 30 dB and −20 dB. For example, a higher value of SSIR (e.g. 20 dB) is achieved if the UE can more effectively mitigate the SI. On the other hand, a lower value of SSIR (e.g. −10 dB) is achieved if the UE cannot effectively mitigate the SI.

In an embodiment, the CSI report comprises a first set of information indicative of channel state information associated to half HD transmission mode and/or a second set of information indicative of channel state information associated to FD transmission mode:

the first set, being referred to as half duplex CSI, CSI-HD, may be derived by the UE in HD mode with no impact of SI due to the UE's own transmission; this set may correspond to currently specified CSI information (e.g. CQI, PMI, RI etc.), and the second set being referred to as full duplex CSI, CSI-FD, that corresponds to the CSI derived by the UE in FD mode where the UE reception includes an estimated, predicted and/or calculated impact of SI due to the own UL transmission of the UE, e.g. taking into account FD related capabilities (e.g. SI suppression) of the UE. The CSI-FD may comprise one or more of full duplex indicators, comprising a channel quality indicator, CQI-FD, rank indicator, RI-FD, and/or a precoding matrix indicator, PMI-FD, as being described in more detail in the following.

A report comprising both sets of information may be sent by the UE as an extended or enhanced CSI feedback (E-CSI-FD), when being configured in FD communication mode of operation.

Details of the reporting, e.g. periodicity or triggering conditions to send the CSI report may be controlled by the network node (and corresponding commands being provided to the UE) and/or are based on one or more predefined rules.

CQI-FD may comprise a value out of a number of pre-defined values similar to those CQI values as mentioned in the background section. In accordance with above-cited TS 36.213, such values may be indicative of a code rate and hence the efficiently that may increase with increasing values (e.g. out of a range of 16 values).

In an embodiment, the CQI-FD may be indicative of one or a plurality of further information, e.g.:

about what MCS (for the DL transmission) the UE can support in case of FD communication. This MCS in turn may depend on the uplink power that the UE uses for upcoming UL transmissions, SI cancelling capabilities, and/or on a current path loss estimate (e.g. based on DL RS measurements).

a measured or estimated SINR on previous DL transmissions; the SINR may be defined with respect to the received DL signal-to-interference-plus-noise-ratio, SSIR, wherein interference may include both an external interference and the self-interference, SI (therein, SI is caused at a receiver of a node by a transmitter of the same node. Interference other than the SI may be regarded as the external interference. Example of external interference is interference caused by other nodes, by neighboring cells etc.).

an experienced and/or predicted self-interference-to-noise (SI-to-N)-ratio and/or self-interference-to-interference (SI-to-I)-ratio. Optionally, this may also include an indication on the assumed, predicted and/or recommended UL transmit power levels associated with the predicted SI-to-N and/or SI-to-I levels.

In a further embodiment, the CSI-FD comprises a FD rank indicator RI_FD indicating a preferred rank that may be used for DL MIMO operation in FD communication (that is in the presence of SI).

In a further embodiment, the CSI-FD comprises a FD precoding matrix indicator PMI-FD indicating a preferred pre-coding matrix, PM that may be used for DL MIMO operation in FD communication. The PMI-FD may comprise explicit information describing elements of the PM and/or implicit information, e.g. PM indices (the set of PMs and associated index set can be different and specific for FD communication mode).

As discussed above, the network may configure a CSI reporting mechanism at the UE, such that the UE shall estimate and transmit either CSI-FD report or E-CSI-FD report, which comprises both the CSI-FD and CSI-HD reports. Such reporting mode command may be comprised by the CSI configuration message of the above described second step S12.

The CSI configuration message may further comprise triggering conditions for aperiodic or event triggered periodic CSI reporting as being discussed in more detail below.

Figure 4:
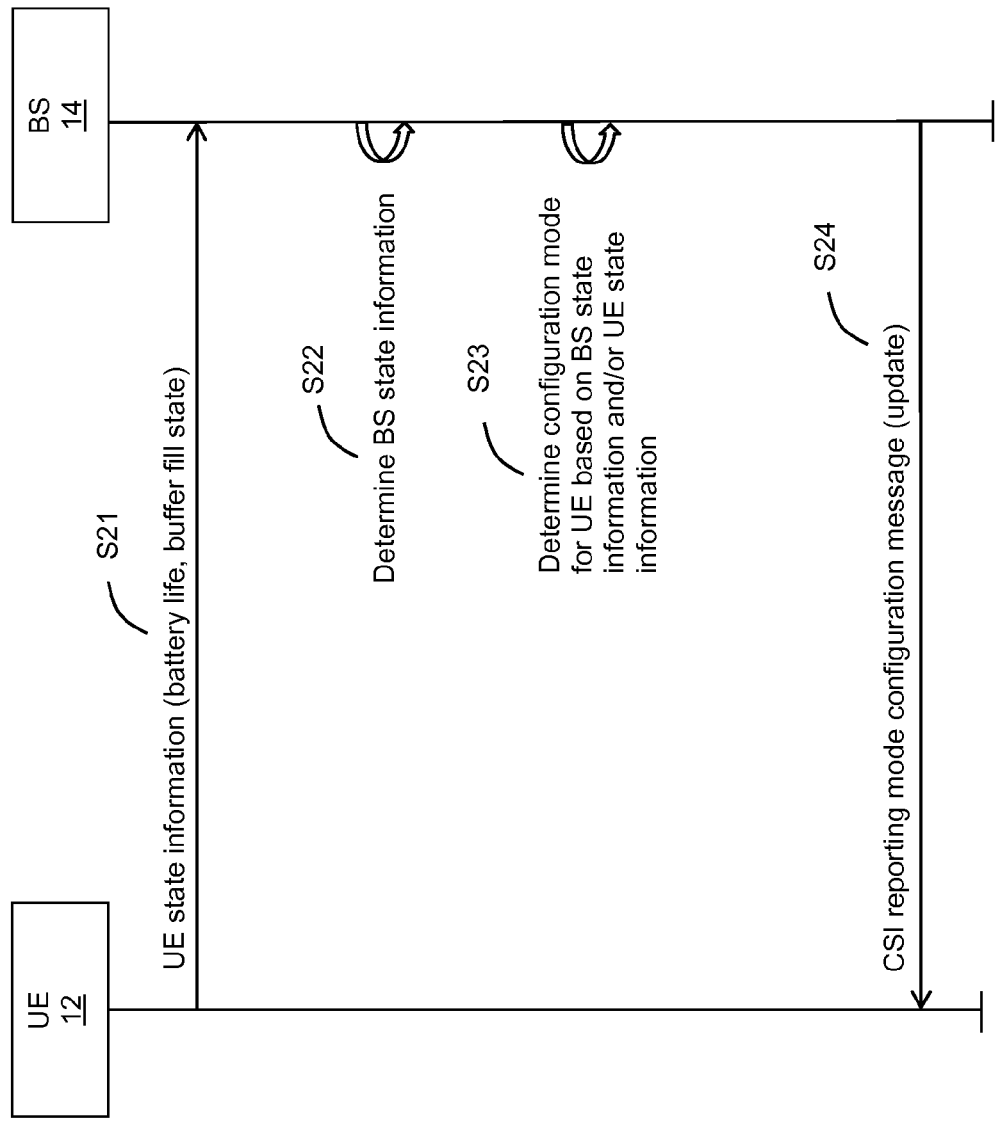
FIG. 4 illustrates a sequence of messages and steps performed by a wireless device and a base station for a channel state information update according to some embodiments of the present disclosure.

FIG. 4 shows an exemplary mechanism wherein the base station 14 uses one or more criteria to decide whether to configure the UE 12 with only CSI-FD reporting mechanism or with E-CSI-FD reporting mechanism. Thereto, in a first step of this mechanism S21, the UE 12 may transmit UE state information. Such information may comprise UE battery life information and/or UE buffer fill information. In a second step of this mechanism S22, the network node 14 may determine network state information such as cell load information and type of service or bit rate requirement information. In a third step of this mechanism S23, the base station 14 determines a configuration mode for the UE 12 based on the UE state information and/or the network state information.

Examples of Criteria:

Cell load information: In case cell load is above a threshold the network node may configure one or more FD capable UEs to perform E-CSI-FD reporting. In order to decrease a cell load or interference some of the UEs may be in scheduled or configured to HD mode. Examples of cell load are number of FD UEs or FDD and HD UEs in the cell.

Type of service or bit rate requirement information: In case that a UE does not need very high date rate or the packet transmission delay does not have to be very short, the network may configure one or more FD capable UEs to perform E-CSI-FD reporting.

UE battery life information: if the battery of a UE is below threshold (e.g. below 20% of total energy), the network may configure the UE to only report CSI-FD as it requires less processing and signaling resources compared to the E-CSI-FD reporting.

UE buffer fill information: If a buffer size containing UE data is above a threshold, the network may configure the UE to report only CSI-FD, as FD communications would lead to scheduling the UE more frequently and thus emptying its buffer.

As discussed above, The CSI reporting configuration may further specify additional information related to the CSI reporting. Examples of additional information are whether the CSI report is periodic, aperiodic, periodicity for periodic CSI reporting, and one or more triggering conditions for aperiodic or event-triggered periodic CSI reporting. The configuration may further specify whether CSI-FD and CSI-HD should be estimated in the same or different resources and information about resources in case of latter, UL physical channel (e.g. UL data or control channels) for transmitting CSI reports etc. Parameters associated with CSI reporting mechanism may be set by default or may be pre-defined.

Example for parameters the UE configured for reporting E-CSI-FD related to CSI reporting mechanism are:

As default, unless specified otherwise, the UE shall estimate both CSI-FD and CSI-HD over the same resources, e.g. in the same time-frequency resources such as resource block(s) or subframe(s) etc. In this case for example if the UE is also configured to report CSI once every frame (i.e. 10 ms), then the UE may estimate and report both CSI-FD and CSI-HD for the same subframe, e.g. subframe #0. This approach enables the network node to better determine the difference of DL channel qualities in FD and HD operations.

As default, unless specified otherwise, the UE shall estimate CSI-FD and CSI-HD over a first set of resources and a second set of resources respectively. The first set of resources and second set of resources may have a certain relation or the resources may be pre-defined (e.g. specific resources subframes). In this case for example if the UE is also configured to report CSI once every frame (i.e. 10 ms), the UE may estimate and report CSI-FD and CSI-HD for different subframes, e.g. subframe #0 and subframe #5 respectively. This approach may reduce processing resources at the UE.

The network node may by default or explicitly configure the UE with the same or different set of resources for estimating and reporting of CSI-FD and CSI-HD as part of E-CSI-FD reporting.

Examples of triggering conditions for aperiodic or event triggered periodic CSI reporting are:

By default, the UE in FD may always send both CSI-FD and CSI-HD (as part of the E-CSI-FD report);

If the UE Tx power is above a certain threshold, the UE sends both CSI-FD and CSI-HD; otherwise UE sends only CSI-FD. This threshold can be explicitly configured or reconfigured by the network node, or the UE can use a default threshold value that e.g. depends on the UE category;

If the received DL signal quality in FD (e.g. SINR including SI) is below a threshold, the UE sends both CSI-FD and CSI-HD; otherwise UE sends only CSI-FD;

The UE sends both CSI-FD and CSI-HD, if the difference between them is above a threshold. Otherwise the UE may report either CSI-FD or CSI-HD, which may be pre-defined or configured by the network node. The threshold can also be pre-defined or configured by the network node. The CQI reports are expressed in terms of pre-defined indices (e.g. between 0 and 31), where each index corresponds to different transport format i.e. MCS that can be used for scheduling. As an example the UE shall report both CSI-FD and CSI-HD provided the difference between the CQI-FD and CQI-HD is more a certain value e.g. greater than "6" wherein this value refers to a difference between the indices of CQI-FD and CQI-HD. Note that when reporting CSI-FD and CSI-HD, the UE may report the index of either CQI-FD or CQI-HD, and the difference between CQI-FD and CQI-HD. The advantage of this mechanism is a reduction in signaling overheads and also less interference on the average.

The base station 14 also configures the UE reporting behavior after any combination of the above triggering conditions has been fulfilled in terms of reporting periodicity (e.g. send CSI-HD and/or CSI-FD report to network node in every N subframe or every M milliseconds).

The content (e.g. specific information elements) of, or information associated with the E-CSI-FD can also depend on base station configurations or pre-defined rule(s). Examples of such contents or information are:

Max MCS (e.g. 64 QAM modulation, coding rate ¾, maximum number of spatial stream=3) that the base station can use for DL transmission assuming FD bearer and some maximum UL transmit power level. This is because the highest MCS can depend on the UE UL transmitting power level due to SI;

Potentially explicit CQI-FD and/or CQI-HD numerical values in terms of explicit modulation modes and encoding rates (e.g. Modulation: QPSK, coding rate ½); and possibly the difference in numerical values between CQI-FD and CQI-HD;

Bandwidth over which the reported CQI-FD and/or CQI-HD is estimated by the UE. For example the report can be applicable for the entire bandwidth (aka wide bandwidth or wideband CQI). The report may also be applicable for part of bandwidth such as over 5 resource blocks (aka sub-band CQI);

Current estimate of the ratios/values between/of DL received power, interference and SI while the E-CSI-FD is estimated by the UE;

As discussed above, one E-CSI-FD report may contain one value (e.g. out of a range of values as being currently defined for CQI) each associated to CSI-FD and CSI-HD. The network node may use each single sets of reported values of CSI-FD and CSI-HD for the decision. Alternatively it may use aggregated values of CSI-FD and CSI-HD (i.e. several E-CSI-FD reports) depending on one or more factors such as: the type of UE radio operation, difference between CSI-HD and CSI-FD values. For example if the difference between CSI-HD and CSI-FD is below a threshold, the network node may aggregate several reports and decide whether to schedule the UE with FD or HD operation.

In the following, examples for configuring UE radio operations by the base station 14 are given:
- Communication mode (HD or FD) to be used in one or more time resources e.g. in the next N time resources (e.g. time slots, subframes, frames). For example the network node may only schedule the UE using FD provided the reported CSI-FD is not lower than the reporting CSI-HD by certain threshold e.g. CQI index difference of 7.
- Transport format or MCS to be used on the DL in certain time resource for scheduling the UE in the selected duplex mode e.g. in the next subframe;
- Rank to be used for the DL transmission in case DL MIMO is employed in certain time resource for serving the UE in the selected duplex mode e.g. next subframe;
- Pre-coding to be used for the DL transmission in case DL MIMO is employed in certain time resource for serving the UE in the selected duplex mode e.g. next subframe;
- maximum UL transmit power that the UE shall use in FD mode in certain time resource e.g. next subframe; and
- maximum DL transmit power with which the UE shall be served in FD mode in certain time resource e.g. next subframe.

Above-described embodiments enable the network to acquire an estimated and/or measured value of the SSIR at the UE at a set of different frequencies (f). For the following embodiment, an example for a joint UL-DL throughput optimization based on the E-CSI-FD reports and the SSIR estimate will be explained. Thereto, it may be assumed that the network node determines the SSIR.

Further, the network may determine UL and DL power scaling factors, $\alpha_{UL}(f)$ and $\alpha_{DL}(f)$, to scale down the maximum UL and DL transmit power values in resource blocks at each frequency f to maximize an overall spectral efficiency.

As result, the base station 14 may determine for each frequency f at least one of:
- a maximum UL transmit power that the UE shall use in FD mode in certain time resource e.g. next subframe; and
- a maximum DL transmit power with which the UE shall be served in FD mode in certain time resource e.g. next subframe.

In an embodiment, the power scaling factors may be determined as functions of achievable data rates R_DL and R_UL in the DL and UL respectively. Thereto, the network may perform the following computations:

$$\{\alpha_{UL}^{optimal}(f), \alpha_{DL}^{optimal}(f)\} =$$

$$\underset{\{\alpha_{UL}(f), \alpha_{DL}(f)\}}{\operatorname{argmax}} \left\{ \sum_f \left[ R_{DL}(SINR_{DL}(\alpha_{UL}(f), \alpha_{DL}(f)) + R_{UL}(SINR_{UL}(\alpha_{UL}(f), \alpha_{DL}(f)))\right] \right\} = \underset{\{\alpha_{UL}(f), \alpha_{DL}(f)\}}{\operatorname{argmax}}$$

$$\left\{ \sum_f \left[ R_{DL}\left(\left(\frac{1}{\alpha_{DL}(f) SINR_{DL,HD}(f)} + \frac{I_{same\_UE}(f)\alpha_{UL}(f)}{SSIR_{UE}(f)}\right)^{-1}\right) + R_{UL}\left(\left(\frac{1}{\alpha_{UL}(f) SINR_{UL,HD}(f)} + \frac{\alpha_{DL}(f)}{SSIR_{eNB}(f)}\right)^{-1}\right) \right] \right\}$$

wherein the indicator variable $I_{same\_UE}(f)$ equals 1 if the same UE is assigned for UL and DL at frequency f, and equals 0 otherwise. Note that radio resource blocks at different frequencies may be assigned to different UEs with or without FD capabilities. For HD-only UEs (that is for UEs that do not support the FD communication mode), the self-interference is by definition zero, ($I_{same\_UE}(f) \equiv 0$), demanding that $\alpha_{UL}(f)=0$ in order to obtain non-zero throughput at downlink.

R_DL and R_UL represent data rates achievable in DL and UL, respectively. These are functions of the SINR (signal-to-interference-plus-noise-ratio) in DL and UL respectively. Typically, these values may be obtained by predetermined look-up table. (Just to be noted, in theory, these values are closely approximated by the well-known Shannon formula, e.g. R_DL(SINR_DL)=log(1+SINR_DL) and R_DL(SINR_UL)=log(1+SINR_UL))

A resource block at frequency f may represent a set of consecutive subcarriers centered on the frequency f in a multi-carrier (e.g. OFDMA) system. For example, in LTE, a resource block may represent a block of 12 subcarriers, each of 15 kHz bandwidth, for a total of 12×15=180 kHz bandwidth. If the system allows finer granularity of scheduling, a resource block at the frequency f may simply represent a particular subcarrier at frequency f.

From the power scaling factors, the base station 14 and the UE 12 can derive the proper transmission power in the DL and UL, respectively, based on the maximum DL and UL transmit power values known to them.

For a given scheduling decision (which determines SINR_UL_HD(f), SINR_DL_HD(f), SSIR_UE(f) and I_same_UE(f) at a given frequency f depending on which UE is scheduled at frequency f), the equation shows an example of how to determine an appropriate transmit power in DL and UL so that the total throughput of the base station 14 including both UL and DL for specific time resource can be maximized, since the UL and DL transmissions may be mutually interfering with each other due to self-interference in full-duplex mode in both the base station 14 and the UE 12.

Figure 5:
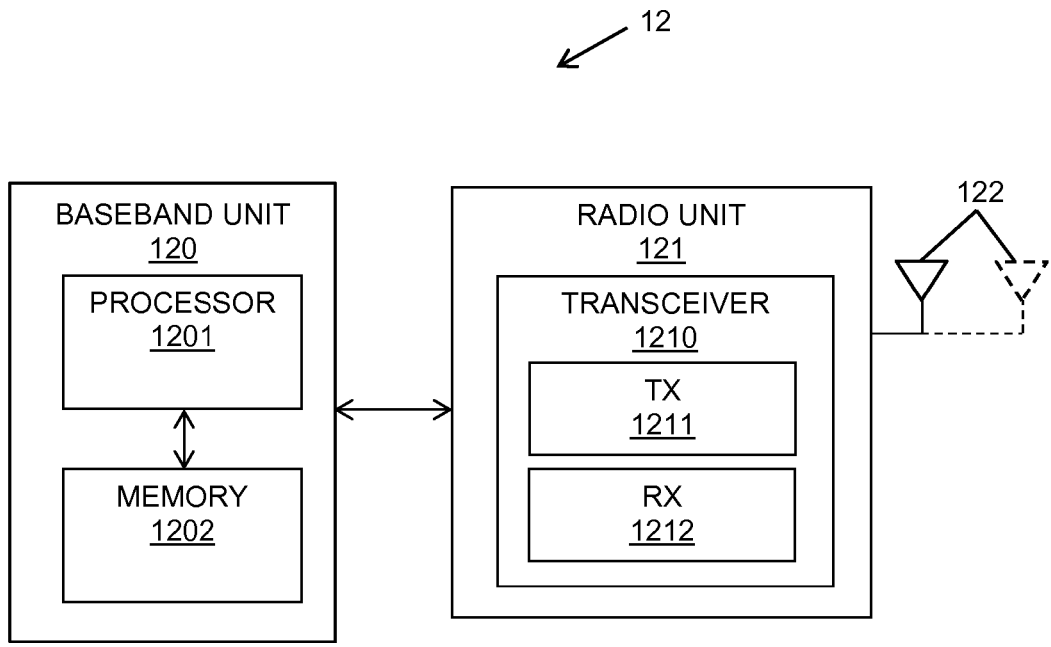
FIG. 5 is a block diagram of structural units of the wireless device according to some embodiments of the present disclosure.

As shown in FIG. 5, the example wireless communication device 12 includes a baseband unit 120, a radio unit 121 and one or a plurality of antennas 122. The baseband unit 120 is coupled to the radio unit 121. The baseband unit 120 comprises a device processor 1201 and a device memory 1202. The radio unit 212 comprises a transceiver 1210 that is coupled to the one or a plurality of antennas 122. The transceiver comprises a transmission circuit TX 1211 and a receiver circuit RX 1212. In particular embodiments, some or all of the functionality described above as being provided by UEs, MTC or M2M devices, and/or any other types of wireless communication devices may be provided by the device processor 1201 executing instructions stored on a computer-readable medium, such as the device memory 1202. Alternative embodiments of the wireless communication device may include additional components beyond those shown here that may be responsible for providing certain aspects of the device's functionality, including any of the functionality described above and/or any functionality necessary to support the solution described above.

Figure 6:
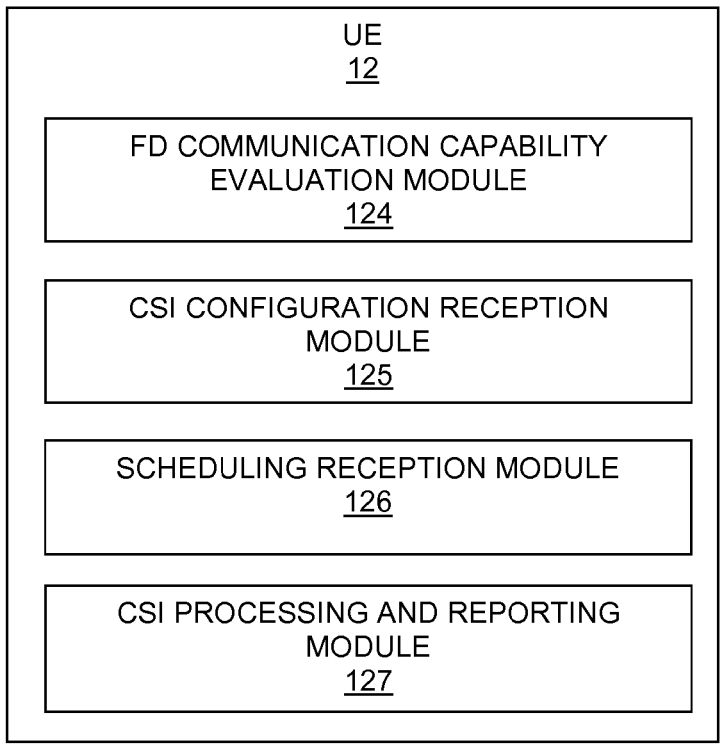
FIG. 6 is a block diagram of functional units of the wireless device according to some embodiments of the present disclosure.

As shown in FIG. 6, the example wireless communication device 12 includes the following exemplary functional units:
- a communication capabilities evaluation module 124 adapted to determining an impact of self-interference at a receiver 1212 of the UE 12 due to an uplink transmission to the network node 14 in case of full duplex communication, a CSI configuration reception module 125 adapted to receive a CSI reporting mode configuration message S12 as shown in FIG. 3;

a scheduling decision reception module 126 adapted to receive scheduling decision message S02 as shown in FIG. 2; and a CSI processing and reporting module 127 adapted to process the reporting mode configuration message S12 and/or the scheduling decision S01, and to provide a CSI report S14 as shown in FIG. 3.

Figure 7:
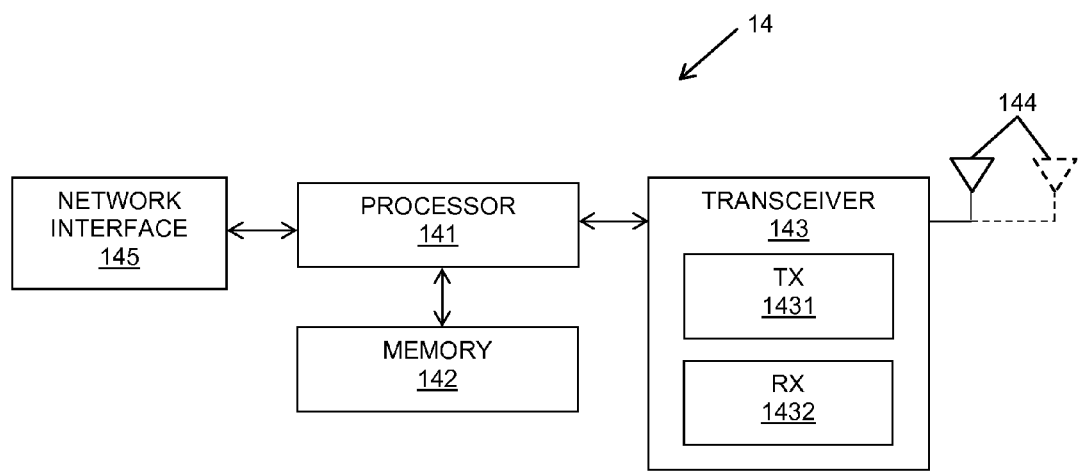
FIG. 7 is a block diagram of structural units of the base station according to some embodiments of the present disclosure.

As shown in FIG. 7, the example network node or base station 14 includes a node processor 141, a node memory 142, a node transceiver 143, one or a plurality of node antennas 144 and a network interface 145. The node processor 141 is coupled to the node memory 142, to the network interface 145 and the node transceiver 143 that is coupled to the one or the plurality of node antennas 144. The node transceiver 143 comprises a transmission circuit TX 1431 and a receiver circuit RX 1432. In particular embodiments, some or all of the functionality described above as being provided by a base station, a node B, an enhanced node B, and/or any other type of network node may be provided by the node processor executing instructions stored on a computer-readable medium, such as the node memory 142. Alternative embodiments of the radio access node may include additional components responsible for providing additional functionality, including any of the functionality identified above and/or any functionality necessary to support the solution described above.

Figure 8:
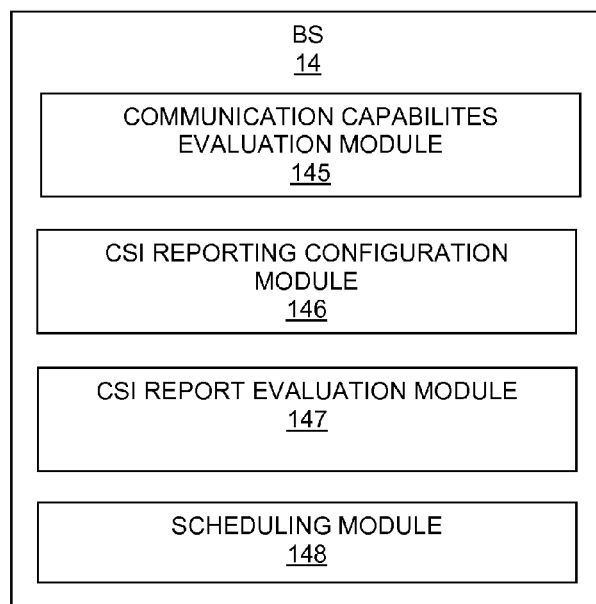
FIG. 8 is a block diagram of functional units of the wireless device according to some embodiments of the present disclosure.

As shown in FIG. 8, the example wireless communication device 14 includes the following exemplary functional units:

a communication capabilities evaluation module 145 adapted to evaluate communication mode capabilities message S11 received from the UE 12 as shown in FIG. 3;

a CSI reporting configuration module 146 adapted to send a CSI reporting mode configuration message S12 to the UE 12 as shown in FIG. 3;

a communication capabilities evaluation module 147 adapted to process a CSI report S14 received from the UE 12; and a scheduling module 148 adapted to perform a scheduling decision based on results of communication capabilities evaluation module 145 and/or the CSI report evaluation module 148.

The invention claimed is:

1. A method performed at a user device, UE, for supporting a transmission mode configuration with respect to a communication channel between the UE and an network node of a radio network, comprising:
   determining an impact of self-interference at a receiver of the UE due to an uplink transmission to the network node in case of full duplex communication,
   generating a channel state information comprising at least an information of said impact of self-interference, wherein the UE generates the channel state information to be indicative of a ratio of a downlink signal-to-self-interference, SSIR, at the receiver of the UE, and
   transmitting the channel state information to the network node,
   wherein the UE generates the channel state information comprising a signal to interference plus noise ratio, SINR, value associated to full duplex communication and an SINR value associated to half duplex communication, to enable network the node to determine the SSIR based on the received channel state information.

2. The method of claim 1, wherein the channel state information further comprises information indicative half duplex and/or full duplex communication capabilities for the communication channel.

3. The method of claim 1, wherein the channel state information is indicative of a first achievable overall bit rate associated to using half duplex communication and a second achievable overall bit rate associated to using full duplex communication.

4. The method of claim 1, wherein the UE performs channel state information reporting comprising information associated both to full duplex communication and to half duplex communication, if one or a plurality of the following conditions are met:
   an amount of battery of the UE is above a defined threshold,
   a requested data rate is above a defined data rate threshold,
   a cell load is below a defined load threshold, and
   a UE buffer is filled with UE transmission data above a defined buffer fill threshold.

5. A user equipment UE adapted for communicating on a communication channel between the UE and a network node of a radio network, comprising:
   a capability evaluation module adapted to determining an impact of self-interference at a receiver of the UE due to an uplink transmission to the network node in case of full duplex communication on the communication channel,
   a scheduling reception module adapted to receive a scheduling decision indicative of whether the UE shall perform half duplex or full duplex communication, and
   a channel state processing and reporting module adapted to reporting channel state information comprising an information about the impact of self-interference,
   wherein the channel state processing and reporting module is further adapted to generate the channel state information being indicative of a ratio of a downlink signal-to-self-interference, SSIR at the receiver of the UE,
   wherein the channel state processing and reporting module is adapted to generate the channel state information being indicative of SINR values associated to full duplex and to half duplex communication, so that the network node is enabled to determine the SSIR based on the received SINR values.

6. The UE of claim 5, further comprising
   a channel state information configuration reception module adapted to receive a channel state information reporting mode configuration message, and
   the channel state processing and reporting module further being adapted to reporting the channel state information according to the channel state information reporting mode configuration message.

7. The UE of claim 6, wherein the channel state processing and reporting module is further adapted to generate channel state information being indicative of a first achievable overall bit rate associated to using half duplex communication and a second achievable overall bit rate associated to using full duplex communication.

8. A method performed at a user device, UE, for supporting a transmission mode configuration with respect to a communication channel between the UE and an network node of a radio network, comprising:
   determining an impact of self-interference at a receiver of the UE due to an uplink transmission to the network node in case of full duplex communication, generating a channel state information comprising at least an information of said impact of self-interference, wherein the UE generates the channel state information to be indicative of a ratio of a downlink signal-to-self-interference, SSIR, at the receiver of the UE, and transmitting the channel state information to the network node, wherein the UE determines the SSIR based on a first signal to interference plus noise ratio, SINR, associated to full duplex communication mode and a second SINR associated to half duplex communication mode.

9. The method of claim 8, wherein the channel state information further comprises information indicative half duplex and/or full duplex communication capabilities for the communication channel.

10. The method of claim 8, wherein the channel state information is indicative of a first achievable overall bit rate associated to using half duplex communication and a second achievable overall bit rate associated to using full duplex communication.

11. The method of claim 8, wherein the UE performs channel state information reporting comprising information associated both to full duplex communication and to half duplex communication, if one or a plurality of the following conditions are met:

an amount of battery of the UE is above a defined threshold, a requested data rate is above a defined data rate threshold, a cell load is below a defined load threshold, and a UE buffer is filled with UE transmission data above a defined buffer fill threshold.

12. A method performed at a user device, UE, for supporting a transmission mode configuration with respect to a communication channel between the UE and an network node of a radio network, comprising:

determining an impact of self-interference at a receiver of the UE due to an uplink transmission to the network node in case of full duplex communication, generating a channel state information comprising at least an information of said impact of self-interference, wherein the UE generates the channel state information to be indicative of a ratio of a downlink signal-to-self-interference, SSIR, at the receiver of the UE, and transmitting the channel state information to the network node, wherein the UE determines the SSIR based on each a value indicative of a lower limit and an upper limit respectively of a first signal to interference plus noise ratio, SINR, associated to full duplex communication mode, and on each a value indicative of a lower limit and an upper limit respectively of a second SINR associated to half duplex communication mode.

13. A method performed at a user device, UE, for supporting a transmission mode configuration with respect to a communication channel between the UE and an network node of a radio network, comprising:

determining an impact of self-interference at a receiver of the UE due to an uplink transmission to the network node in case of full duplex communication, generating a channel state information comprising at least an information of said impact of self-interference, and transmitting the channel state information to the network node, wherein the UE performs the following steps:

sending a communication mode capabilities message that is indicative of full duplex communication capabilities at the UE, receiving a CSI reporting mode communication message indicative of whether the UE shall be configured to perform a full duplex communication or not, in case that the UE is being configured for full duplex communication, determining a SSIR value or values to determine the SSIR, and providing a channel state report indicative of the SSIR.

14. A user equipment UE adapted for communicating on a communication channel between the UE and a network node of a radio network, comprising:

a capability evaluation module adapted to determining an impact of self-interference at a receiver of the UE due to an uplink transmission to the network node in case of full duplex communication on the communication channel, a scheduling reception module adapted to receive a scheduling decision indicative of whether the UE shall perform half duplex or full duplex communication, and a channel state processing and reporting module adapted to reporting channel state information comprising an information about the impact of self-interference, wherein the channel state processing and reporting module is further adapted to generate the channel state information being indicative of a ratio of a downlink signal-to-self-interference, SSIR at the receiver of the UE, wherein the channel state processing and reporting module is further adapted to determine the SSIR based on a first signal to interference plus noise ratio, SINR, associated to full duplex communication mode and a second SINR associated to half duplex communication mode.

15. The UE of claim 14, further comprising a channel state information configuration reception module adapted to receive a channel state information reporting mode configuration message, and the channel state processing and reporting module further being adapted to reporting the channel state information according to the channel state information reporting mode configuration message.

16. The UE of claim 14, wherein the channel state processing and reporting module is further adapted to generate channel state information being indicative of a first achievable overall bit rate associated to using half duplex communication and a second achievable overall bit rate associated to using full duplex communication.

17. A user equipment UE adapted for communicating on a communication channel between the UE and a network node of a radio network, comprising:

a capability evaluation module adapted to determining an impact of self-interference at a receiver of the UE due to an uplink transmission to the network node in case of full duplex communication on the communication channel, a scheduling reception module adapted to receive a scheduling decision indicative of whether the UE shall perform half duplex or full duplex communication, and a channel state processing and reporting module adapted to reporting channel state information comprising an information about the impact of self-interference, wherein the channel state processing and reporting module is further adapted to generate the channel state information being indicative of a ratio of a downlink signal-to-self-interference, SSIR at the receiver of the UE, wherein the channel state processing and reporting module is further adapted to determining the SSIR based on each a value indicative of a lower limit and an upper limit respectively of a first signal to interference plus noise ratio, SINR, associated to full duplex communication mode, and on each a value indicative of a lower limit and an upper limit respectively of a second SINR associated to half duplex communication mode.

\* \* \* \* \*